United States Patent
Shimizu

(10) Patent No.: US 11,858,857 B2
(45) Date of Patent: Jan. 2, 2024

(54) SILICON CARBIDE CERAMIC HONEYCOMB STRUCTURE AND ITS PRODUCTION METHOD

(71) Applicant: PROTERIAL, LTD., Tokyo (JP)

(72) Inventor: Kenichiro Shimizu, Fukuoka (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 18/037,696

(22) PCT Filed: Mar. 23, 2022

(86) PCT No.: PCT/JP2022/013530
§ 371 (c)(1),
(2) Date: May 18, 2023

(87) PCT Pub. No.: WO2022/202903
PCT Pub. Date: Sep. 29, 2022

(65) Prior Publication Data
US 2023/0322630 A1    Oct. 12, 2023

(30) Foreign Application Priority Data

Mar. 26, 2021    (JP) .................................. 2021-054389

(51) Int. Cl.
*C04B 35/565*    (2006.01)
*C04B 35/636*    (2006.01)
(Continued)

(52) U.S. Cl.
CPC ........ *C04B 35/565* (2013.01); *B01D 39/2068* (2013.01); *B01D 46/2429* (2013.01);
(Continued)

(58) Field of Classification Search
None
See application file for complete search history.

(56) References Cited

U.S. PATENT DOCUMENTS

2003/0134084 A1    7/2003    Ichikawa et al.
2014/0011667 A1    1/2014    Tomita et al.
(Continued)

FOREIGN PATENT DOCUMENTS

JP    06-182228 A    7/1994
JP    2002-201082 A    7/2002
(Continued)

OTHER PUBLICATIONS

Liu, Shifeng et al., "Fabrication and characterization of cordierite-bonded porous SiC ceramics", Ceramics International, 2009, pp. 597-602, vol. 35.
(Continued)

*Primary Examiner* — Elizabeth Collister
(74) *Attorney, Agent, or Firm* — Sughrue Mion, PLLC

(57) ABSTRACT

A silicon carbide ceramic honeycomb structure having large numbers of axially penetrating flow paths partitioned by porous silicon carbide cell walls, the cell walls comprising silicon carbide particles as aggregate and binder layers for binding the silicon carbide particles, the binder layers having at least a cordierite phase and a spinel phase, and the molar ratio M1 of the cordierite phase [=cordierite phase/(cordierite phase+spinel phase)] being 0.4-0.9.

8 Claims, 2 Drawing Sheets

(51) Int. Cl.
  *F01N 3/28* (2006.01)
  *B01D 46/24* (2006.01)
  *C04B 35/626* (2006.01)
  *C04B 35/64* (2006.01)
  *F01N 3/022* (2006.01)
  *B01D 39/20* (2006.01)
  *C04B 38/00* (2006.01)

(52) U.S. Cl.
  CPC . *B01D 46/24491* (2021.08); *B01D 46/24492* (2021.08); *C04B 35/62655* (2013.01); *C04B 35/6365* (2013.01); *C04B 35/64* (2013.01); *C04B 38/0009* (2013.01); *F01N 3/0222* (2013.01); *F01N 3/2828* (2013.01); *B01D 2239/10* (2013.01); *B01D 2239/1208* (2013.01); *B01D 2239/1216* (2013.01); *B01D 2279/30* (2013.01); *C04B 2235/3206* (2013.01); *C04B 2235/3217* (2013.01); *C04B 2235/3826* (2013.01); *C04B 2235/6021* (2013.01); *C04B 2235/656* (2013.01); *C04B 2235/6583* (2013.01); *F01N 2330/06* (2013.01); *F01N 2330/32* (2013.01); *F01N 2330/48* (2013.01); *F01N 2370/04* (2013.01)

(56) References Cited

U.S. PATENT DOCUMENTS

2014/0370232 A1* 12/2014 Izumi .................. C04B 35/195
                                                            428/116
2014/0370233 A1  12/2014 Izumi et al.
2014/0378297 A1  12/2014 Tomita et al.

FOREIGN PATENT DOCUMENTS

| JP | 2005-511294 A | 4/2005 |
| JP | 2005-296936 A | 10/2005 |
| JP | 2010-105861 A | 5/2010 |
| JP | 2017-226560 A | 12/2017 |
| WO | 2012/128149 A1 | 9/2012 |
| WO | 2013/146954 A1 | 10/2013 |
| WO | 2013/147321 A1 | 10/2013 |

OTHER PUBLICATIONS

Office Action of JP2022-539769 dated Aug. 2, 2022 (drafted Jul. 28, 2022).
Office Action of JP2022-539769 dated Oct. 11, 2022 (drafted Oct. 4, 2022).
International Search Report of PCT/JP2022/013530 dated May 17, 2022 [PCT/ISA/210].

* cited by examiner

SILICON CARBIDE CERAMIC HONEYCOMB STRUCTURE AND ITS PRODUCTION METHOD

CROSS REFERENCE TO RELATED APPLICATIONS

This application is a National Stage of International Application No. PCT/JP2022/013530, filed Mar. 23, 2022, claiming priority to Japanese Patent Application No. 2021-054389, filed Mar. 26, 2021.

FIELD OF THE INVENTION

The present invention relates to a silicon carbide ceramic honeycomb structure used in a ceramic honeycomb filter for cleaning exhaust gases discharged from internal combustion engines such as diesel engines, etc. by removing particulate matter, which may be called "PM" hereinafter, from them, and its production method.

BACKGROUND OF THE INVENTION

Because NOx and PM contained in an exhaust gas of a diesel engine are likely to adversely affect humans and environment when discharged into the air, a honeycomb structure carrying a NOx catalyst, and a ceramic honeycomb filter for capturing PM have conventionally been attached as discharge equipment to the discharge pipe of the diesel engine. An example of ceramic honeycomb filters for cleaning an exhaust gas by capturing PM therein is shown in FIGS. 1(a) and 1(b). A ceramic honeycomb filter 100 is constituted by a ceramic honeycomb structure 110 comprising porous cell walls 12 forming large numbers of flow paths 13, 14 and an outer peripheral wall 11, and upstream-side plugs 16a and downstream-side plugs 16b sealing the exhaust-gas-introducing-side end surface 15a and exhaust-gas-discharging end surface 15b of outlet-side-sealed flow paths 13 and inlet-side-sealed flow paths 14 alternately in a checkerboard pattern. As shown by dotted arrows in FIG. 1(b), the exhaust gas flows into the outlet-side-sealed flow paths 13 open on the exhaust-gas-introducing-side end surface 15a, passes through communicating pores on and in the cell walls 12, and is discharged from the inlet-side-sealed flow paths 14 open on the exhaust-gas-discharging end surface 15b. While the exhaust gas passes through the communicating pores on and in the cell walls 12, PM in the exhaust gas is captured, so that the exhaust gas is cleaned. When the captured PM is accumulated to a predetermined amount, it is burned to regenerate the ceramic honeycomb filter. It is known that because such ceramic honeycomb structure has become subjected to a severer use environment, it is formed by refractory particles such as silicon carbide (SiC) particles having excellent heat shock resistance.

JP 06-182228 A (Patent Reference 1) discloses a method for producing a catalyst carrier comprising using silicon carbide powder having a specific surface area of 0.1-5 $m^2/g$ and containing 1.0-5.0% of impurities as a starting material, molding it to a desired shape, drying the resultant green body, and then sintering it in a range of 1600-2200° C. Patent Reference 1 describes that this method can economically produce the catalyst carrier of sintered porous silicon carbide having excellent performance.

The method described in JP 06-182228 A uses only silicon carbide powder as a starting material to form the sintered body, a silicon carbide component sublimated from the silicon carbide particle surfaces being contacted and accumulated between the particles, so that the particles are bound to each other. Thus, an extremely high sintering temperature is needed to form the sintered body, and in the case of producing a filter having high porosity, this sintering mechanism does not sufficiently function, likely resulting in low strength. Also, because this method uses a sintering mechanism of binding silicon carbide particles by the recrystallization of silicon carbide powder itself, an extremely high sintering temperature is needed, resulting in high cost.

As a method for producing a honeycomb structure having enough porosity to suppress pressure loss when used for exhaust gas filters of automobiles, and having high thermal conductivity, inexpensively at a relatively low sintering temperature, JP 2002-201082 A (Patent Reference 2) discloses the following method. Namely, JP 2002-201082 A discloses a method for producing a honeycomb structure comprising mixing and blending silicon carbide particles with metallic silicon and an organic binder to form a moldable material, molding the moldable material to a honeycomb shape, removing the organic binder from the resultant green body by calcining, and then sintering the green body. Patent Reference 2 describes that the sintering temperature is preferably in a range of 1400-1600° C., and that the sintering atmosphere is preferably a non-oxidizing atmosphere such as $N_2$, Ar, etc. in a temperature range higher than or equal to a temperature at which oxidation starts.

Though the method described in JP 2002-201082 A can produce a honeycomb structure having enough porosity to suppress pressure loss when used as a filter, by sintering at a relatively low temperature of 1400-1600° C., sintering is desirably conducted in a non-oxidizing atmosphere to suppress oxidation, resulting in high cost for sintering facilities.

As a method for producing a silicon carbide honeycomb structure having high strength despite high porosity, and excellent heat shock resistance, which is useful for filters required to have higher exhaust gas permeability, JP 2010-105861 A (Patent Reference 3) discloses the following method. Namely, JP 2002-201082 A discloses a method for producing a porous silicon carbide body comprising 1-35% by mass of metal silicide and 0.5-10% by mass of alumina ($Al_2O_3$) and having porosity of 38-80%, by molding a starting material mixture comprising metal, silicon, a carbon source and an aluminum (Al) source to a predetermined shape, and degreasing and sintering the resultant green body. Patent Reference 3 describes that the sintering temperature is preferably 1250-1800° C., and that the sintering atmosphere is preferably an inert atmosphere.

Though the method described in JP 2010-105861 A can produce a porous silicon carbide body having excellent gas permeability and heat shock resistance by sintering at a relatively low temperature of 1250-1800° C., the sintering should be conducted in an argon (Ar) or vacuum atmosphere, resulting in high cost for sintering facilities.

WO 2013/146954 A (Patent Reference 4) discloses a porous material having porosity of 40-90%, which comprises a main aggregate composed of silicon carbide particles, a sub-aggregate composed of at least one of mullite particles and alumina particles, and a binder phase composed of at least one of an amorphous phase and a cordierite phase for binding the aggregates. Patent Reference 4 describes that a honeycomb structure having improved heat shock resistance can be formed. The porous material described in JP 2002-201082 A is obtained by mixing and blending a main aggregate of silicon carbide powder, a sub-aggregate powder, and a binder-phase-forming powder (binder powder), and adding a binder, a surfactant, a pore-forming material, water, etc., if necessary, to form a moldable material, extrusion-molding the moldable material to form a honeycomb green body, and drying and sintering the green body. JP 2002-201082 A describes that the sintering is preferably conducted at 1300-1600° C. in a non-oxidizing atmosphere of nitrogen, argon, etc.

Though the method described in WO 2013/146954 A can produce a porous material having excellent heat shock resistance by sintering at a temperature of 1300-1600° C., the sintering should be conducted in a non-oxidizing atmosphere of nitrogen, argon, etc., resulting in high cost for sintering facilities.

As explained above, when refractory particles such as silicon carbide (SiC) particles are used as materials for forming ceramic honeycomb structures used for ceramic honeycomb filters, extremely high sintering temperatures and a non-oxidizing atmosphere are necessary, and the use of sintering furnaces meeting these conditions results in high cost. Accordingly, the development of a method capable of producing the ceramic honeycomb structure more inexpensively is desired.

OBJECT OF THE INVENTION

Accordingly, an object of the present invention is to provide a silicon carbide ceramic honeycomb structure having enough heat shock resistance for a ceramic honeycomb filter, which can be produced more inexpensively than ever using a sintering process at a lower sintering temperature than ever without needing a non-oxidizing atmosphere, and its production method.

SUMMARY OF THE INVENTION

In view of the above object, the inventor has made intense research to obtain a ceramic honeycomb structure that can maintain enough heat shock resistance even though a sintering process at a lower sintering temperature than ever without needing a non-oxidizing atmosphere is used. As a result, the inventor has paid attention to the formulation of starting material particles, completing the present invention.

Thus, the silicon carbide ceramic honeycomb structure of the present invention, which has large numbers of axially penetrating flow paths partitioned by porous silicon carbide cell walls, is characterized in that the cell walls comprise silicon carbide particles as aggregate and binder layers for binding the silicon carbide particles, the binder layers having at least a cordierite phase and a spinel phase, and the molar ratio M1 of the cordierite phase [=cordierite phase/(cordierite phase+spinel phase)] being 0.4-0.9.

In the silicon carbide ceramic honeycomb structure of the present invention, the porosity of the cell walls is preferably 35-50%.

In the silicon carbide ceramic honeycomb structure of the present invention, the median pore diameter of the cell walls is preferably 5-20 μm.

The method of the present invention for producing a silicon carbide ceramic honeycomb structure comprises the steps of formulating, mixing and blending silicon carbide particles, a binder comprising at least alumina source particles and magnesia source particles, and an organic binder to form a moldable material, extrusion-molding the moldable material to a honeycomb shape, drying the resultant green body, and then sintering the green body in a temperature range of 1200-1350° C. in an air atmosphere.

In the method of the present invention for producing a silicon carbide ceramic honeycomb structure, the alumina source particles and the magnesia source particles are preferably formulated at a molar ratio M2 $[=(Al_2O_3)/(Al_2O_3+MgO)]$ of 0.32-0.50.

In the method of the present invention for producing a silicon carbide ceramic honeycomb structure, the alumina source particles and the magnesia source particles are preferably 6-15% by mass in total, per 100% by mass of the silicon carbide particles.

In the method of the present invention for producing a silicon carbide ceramic honeycomb structure, it is preferable that the alumina source particles are alumina or aluminum hydroxide particles, and the magnesia source particles are magnesium oxide or hydroxide particles, in the binder.

EFFECTS OF THE INVENTION

The present invention can provide a silicon carbide ceramic honeycomb structure having enough heat shock resistance for a ceramic honeycomb filter, which can be produced more inexpensively than ever by a sintering process using a lower sintering temperature than ever without needing a non-oxidizing atmosphere, and its production method.

BRIEF DESCRIPTION OF THE DRAWINGS

FIG. 1(*b*) is a partial cross-sectional view schematically showing an example of ceramic honeycomb filters in parallel with the axial direction.

DESCRIPTION OF THE PREFERRED EMBODIMENTS

Figure 1A:
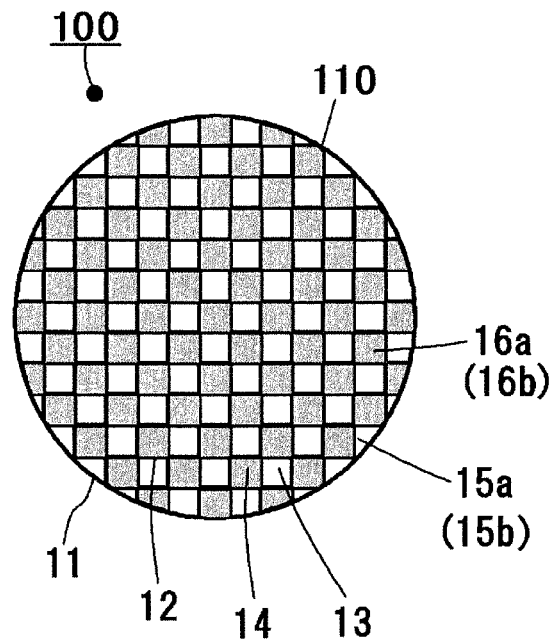
FIG. 1(*a*) is a front view schematically showing an example of ceramic honeycomb filters.
Figure 1B:
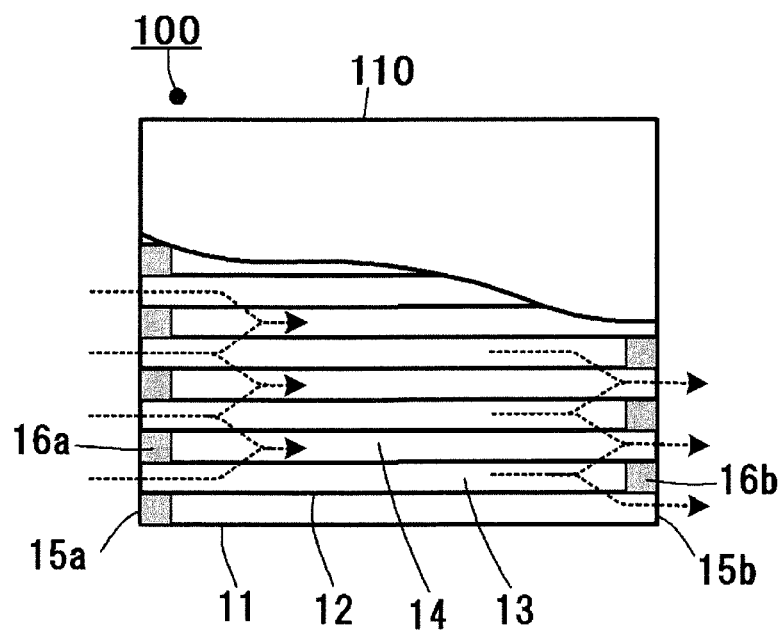

The embodiments of the present invention will be explained below referring to the attached drawings. It should be noted that the present invention is not restricted to the embodiments below, and that modifications and improvements may be made within the scope of the present invention.

[1] Ceramic Honeycomb Structure

The silicon carbide ceramic honeycomb structure of the present invention comprises large numbers of axially penetrating flow paths partitioned by porous silicon carbide cell walls, the cell walls comprising silicon carbide particles as aggregate and binder layers binding the silicon carbide particles, the binder layers comprising at least a cordierite phase and a spinel phase, and the cordierite phase having a molar ratio M1 [=cordierite phase/(cordierite phase+spinel phase)] of 0.4-0.9.

Because the binder layers comprise at least a cordierite phase and a spinel phase, and because the cordierite phase has a molar ratio M1 [=cordierite phase/(cordierite phase+spinel phase)] of 0.4-0.9, the binder layers can have sufficient strength and heat shock resistance. The molar ratio M1 of the cordierite phase is a ratio determined from the molar number of the cordierite phase and the molar number of the spinel phase, by the formula of [cordierite phase (mol)/(cordierite phase (mol)+spinel phase (mol))]. When the molar ratio M1 of the cordierite phase is less than 0.4, the strength is low, and the coefficient of thermal expansion is large, resulting in poor heat shock resistance. On the other hand, when the molar ratio M1 of the cordierite phase exceeds 0.9, the heat resistance becomes low, with cell walls having low porosity. The molar ratio M1 of the cordierite phase is preferably 0.45-0.70. The binder layer may contain, in addition to the cordierite phase and the spinel phase, cristobalite, mullite, forsterite and other crystal phases, and amorphous phases.

The molar ratio M1 of the cordierite phase [=cordierite phase/(cordierite phase+spinel phase)] can be determined as follows. First, part of a sintered ceramic honeycomb structure is pulverized to powder, and subjected to X-ray diffraction measurement to obtain a powder diffraction chart, on which the peak intensity of a (110) plane of cordierite and the peak intensity of a (311) plane of spinel are determined. With these peak intensities, the mass ratio of cordierite to spinel in the overall ceramic honeycomb structure is calculated. With 1 mol of cordierite having a mass of 585.0 and 1 mol of spinel having a mass of 142.3, the above mass ratio is converted to the molar ratio of cordierite to spinel, determining the molar ratio M1 of the cordierite phase per a sum of the cordierite phase and the spinel phase.

Because the cell walls have porosity of 35-50%, the silicon carbide ceramic honeycomb structure of the present invention can keep low pressure loss, while maintaining high strength. When the porosity is less than 35%, the ceramic honeycomb structure suffers large pressure loss. On the other hand, when it exceeds 50%, it is difficult to provide the ceramic honeycomb structure with sufficient strength. The lower limit of the porosity is preferably 38%, and more preferably 40%. On the other hand, the upper limit of the porosity is preferably 49%, and more preferably 48%.

Because the cell walls have a median pore diameter of 5-20 μm, the silicon carbide ceramic honeycomb structure of the present invention can keep high strength. When the median pore diameter is less than 5 μm, the ceramic honeycomb structure suffers large pressure loss. On the other hand, when it exceeds 20 μm, it is difficult to provide the ceramic honeycomb structure with sufficient strength. The lower limit of the median pore diameter is preferably 8 μm, and more preferably 9 μm. On the other hand, the upper limit of the median pore diameter is preferably 18 μm, and more preferably 16 μm.

Figure 2:
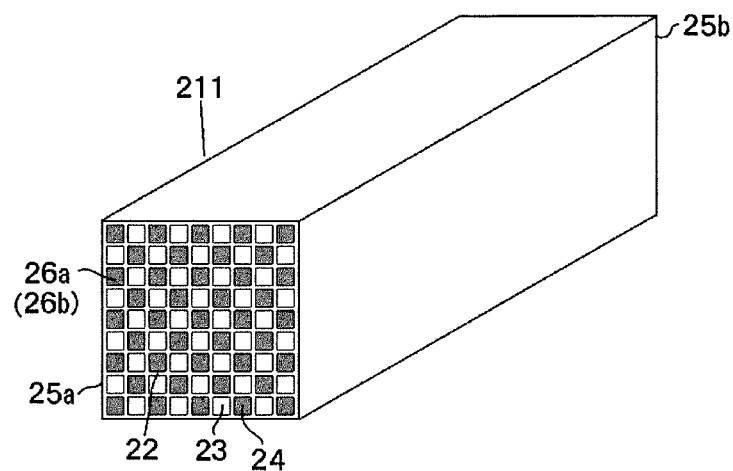
FIG. 2 is a perspective view schematically showing a ceramic honeycomb segment.
Figure 3:
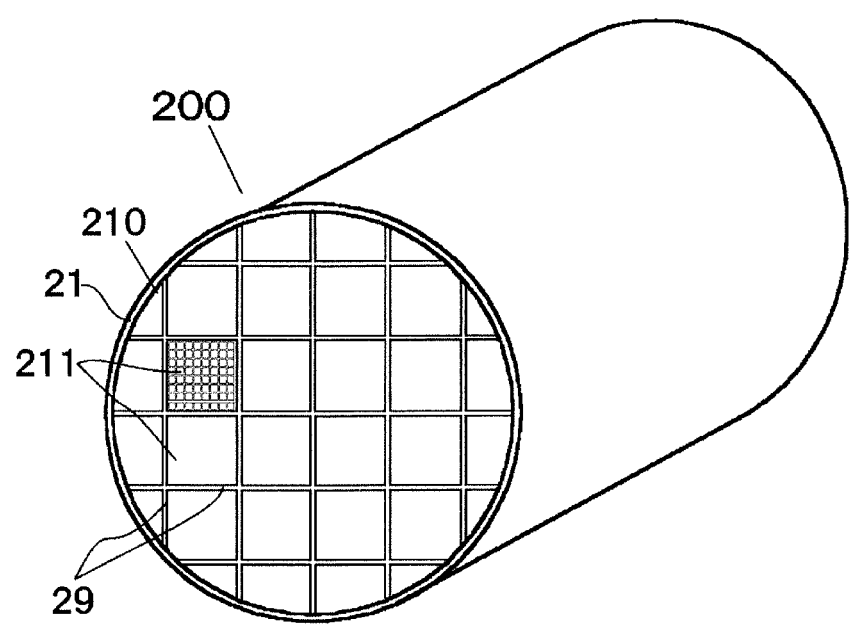
FIG. 3 is a perspective view schematically showing an example of ceramic honeycomb filters formed by integral bonding.

The silicon carbide ceramic honeycomb structure of the present invention can be used as a honeycomb segment 211 as shown in FIG. 2, so that large numbers of honeycomb segments 211 are integrally bonded by binder layers 29 to provide a composite silicon carbide ceramic honeycomb structure 210 as shown in FIG. 3. After integrally bonding large numbers of honeycomb segments 211 by binder layers 29, the resultant composite honeycomb structure is machined to have an outer periphery having a circular, oval, triangular, rectangular or any other desired shape in a cross section perpendicular to its flow paths, and the machined outer periphery is covered with a coating material to form an outer peripheral wall 21.

Flow paths on the exhaust-gas-introducing side 25a or exhaust-gas-discharging side 25b in the silicon carbide ceramic honeycomb structure 210 formed by integral bonding can be plugged alternately in a checkerboard pattern by a known method to provide a ceramic honeycomb filter 200. Plugs 26a, 26b of the flow paths may be formed in green bodies before sintering or sintered honeycomb segments, or after they are integrally bonded by binder layers 29. These plugs may be formed on end surfaces of the flow paths on the exhaust-gas-introducing or exhaust-gas-discharging side, or in inner portions of the flow paths inside the inlet-side end surface 25a or the outlet-side end surface 26b.

[2] Production Method of Silicon Carbide Ceramic Honeycomb Structure

An example of the production methods of the silicon carbide ceramic honeycomb structure of the present invention will be explained.

First, silicon carbide particles as aggregate, a binder comprising at least alumina source particles and magnesia source particles, and an organic binder are formulated and blended. The alumina source particles and the magnesia source particles are respectively particles of compounds including alumina and particles of compounds including magnesia, and they may include particles of compounds including alumina and magnesia. The silicon carbide particles contained as aggregate are bound by binder layers in such a manner as to form pores. The silicon carbide particles preferably have an average particle diameter of 30-50 μm.

The alumina source particles and the magnesia source particles as binders are added preferably at a molar ratio M2 [=($Al_2O_3$)/($Al_2O_3$+MgO)] of 0.32-0.50. With such ratio, the binder layers can contain at least a cordierite phase and a spinel phase. The molar ratio M2 is calculated from the masses of the alumina source particles and magnesia source particles added as follows. The molar number of an alumina component ($Al_2O_3$) in the alumina source particles and the molar number of a magnesia component (MgO) in the magnesia source particles are calculated, and the molar number of the alumina component ($Al_2O_3$) per the total molar number of the alumina component ($Al_2O_3$) and the magnesia component (MgO) is expressed by the molar ratio M2 [=($Al_2O_3$)/($Al_2O_3$+MgO)].

In the case of using aluminum hydroxide [Al(OH)$_3$] as the alumina source and magnesium hydroxide [Mg(OH)$_2$] as the magnesia source, for example, the alumina content in aluminum hydroxide and the magnesia content in magnesium hydroxide are respectively expressed by $$Al(OH)_3=(1/2)Al_2O_3+(3/2)H_2O, \text{ and}$$

$$Mg(OH)_2=MgO+H_2O.$$

Accordingly, the alumina content per 1 mol of aluminum hydroxide is calculated as 0.5 mol, and the magnesia content per 1 mol of magnesium hydroxide is calculated as 1 mol. Using these relations, the molar numbers of the alumina component and magnesia component are determined as described above, to determine the molar ratio M2. Similarly, when particles of a compound (for example, spinel) containing both alumina and magnesia are used, the alumina content ($Al_2O_3$) and the magnesia content (MgO) in this compound are calculated to determine the molar ratio M2.

When the molar ratio M2 is less than 0.32 or more than 0.50, the heat shock resistance is low. The lower limit of the molar ratio M2 is preferably 0.35, and further preferably 0.40. The upper limit is preferably 0.48.

The total amount of the alumina source particles and the magnesia source particles is preferably 6-15% by mass per 100% by mass of silicon carbide particles. When it is less than 6% by mass, the binder layers binding silicon carbide particles have low binding strength, resulting in a ceramic honeycomb structure having low strength. On the other hand, when it is more than 15% by mass, the heat shock resistance is low. The lower limit of the total amount of the alumina source particles and the magnesia source particles is preferably 7% by mass, and more preferably 8% by mass, per 100% by mass of silicon carbide particles. On the other hand, and the upper limit is preferably 14% by mass, and more preferably 13% by mass.

The average particle diameter of the alumina source particles is preferably 1-15 μm. The average particle diameter of the magnesia source particles is preferably 1-15 μm.

The alumina source particles are preferably alumina or aluminum hydroxide particles, and the magnesia source particles are preferably magnesium oxide or hydroxide particles. Using alumina or aluminum hydroxide particles as the alumina source particles, and magnesium oxide or hydroxide particles as the magnesia source particles, sintering can preferably be conducted at a lower sintering temperature than ever without needing a non-oxidizing atmosphere, as described later. It is particularly preferable to use alumina particles as the alumina source particles, and magnesium hydroxide particles as the magnesia source particles. The binder may further contain particles of spinel, mullite, forsterite, etc., which are compounds of alumina and/or magnesia, in addition to the alumina source particles and the magnesia source particles.

The organic binder may be methylcellulose, ethylcellulose, ethyl methylcellulose, carboxymethyl cellulose, hydroxypropyl methylcellulose, hydroxyethyl cellulose, hydroxymethyl cellulose, hydroxyethyl ethylcellulose, etc. Among them, hydroxypropyl methylcellulose and/or methylcellulose are preferable. The organic binder is preferably 5-15% by mass per 100% by mass of the moldable material (silicon carbide particles plus binder).

The mixed starting material is then blended with water to form a plasticized moldable material. The amount of water added, which is adjusted to provide the moldable material with moldable hardness, is preferably 20-50% by mass based on the starting material.

The formed moldable material is extrusion-molded through a known honeycomb-structure-molding die by a known method, to form a honeycomb-structured green body. This green body is dried, machined in its end surfaces, outer peripheral surface, etc., if necessary, and then sintered in a temperature range of 1200-1350° C. in an oxidizing atmosphere to produce a silicon carbide ceramic honeycomb structure.

Though not particularly restrictive, the drying method may be, for example, hot-air drying, microwave-heating drying, high-frequency-heating drying, etc.

In a temperature range of 1200-1350° C., the alumina source particles and the magnesia source particles are sintered to form binder layers binding silicon carbide particles. Because sintering can be conducted at such a relatively low sintering temperature, sintering cost for forming the binder layers can be made lower than ever. When the sintering temperature is lower than 1200° C., the binder phase insufficiently binds silicon carbide particles, failing to obtain sufficient strength. On the other hand, when it is higher than 1350° C., the heat shock resistance is low. Because of the lower sintering temperature, a non-oxidizing atmosphere for suppressing oxidation is not needed unlike in the conventional technology, and sintering can be conducted in an oxidizing atmosphere, thereby avoiding cost increase in the sintering process.

The present invention will be explained below in further detail referring to Examples, without intention of restricting the present invention to thereto.

Examples 1-10, and Comparative Examples 2 and 3

Silicon carbide particles and binder particles (alumina source particles and magnesia source particles) having the particle diameters shown in Table 1 were formulated and blended in the amounts shown in Table 1, together with hydroxypropyl methylcellulose as an organic binder. The mixed starting materials were blended with water to form plasticized moldable materials, each of which was extruded through a honeycomb-structure-molding die in a screw-molding machine, forming a honeycomb-structured green body in the quadrangular prism shape of 34 mm in each side and 304 mm in length. This green body was dried at 120° C. for 2 hours in a hot-air drying machine, and sintered at the highest temperature of 1300° C. in an oxidizing atmosphere to obtain each silicon carbide ceramic honeycomb structure of Examples 1-10 and Comparative Examples 2 and 3 having a cell wall thickness of 8 mil (0.20 mm) and a cell density of 300 cpsi (46.5 cells/cm$^2$).

Comparative Example 1

The silicon carbide ceramic honeycomb structure of Comparative Example 1 was obtained in the same manner as in Example 1, except that the types and amounts of the silicon carbide particles and the binder particles were changed as shown in Table 1, that a degreasing step at 550° C. for 3 hours was added after the hot-air drying of the green body, and that sintering was conducted at the highest temperature of 1450° C. for 2 hours in an argon atmosphere.

With respect to one of the silicon carbide ceramic honeycomb structures obtained in each of Examples 1-10 and Comparative Examples 1-3, the measurements of porosity, median pore diameter, coefficient of thermal expansion, and A-axis compression strength were conducted as described below.

The results are shown in Table 2.

(a) Measurement of Porosity and Median Pore Diameter

The measurement of porosity and median pore diameter was conducted by mercury porosimetry. A test piece (10 mm×10 mm×10 mm) cut out of the ceramic honeycomb structure was set in a measurement cell in Autopore III available from Micromeritics, and the cell was evacuated. Thereafter, mercury was introduced into the cell under pressure to determine the relation between pressure and the volume of mercury pressed into pores in the test piece. The pressure was converted to pore diameter, and a cumulative pore volume (corresponding to the volume of mercury) determined by cumulating the pore diameter from the larger side to the smaller side was plotted against the pore diameter, to obtain a graph showing the relation between the pore diameter and the cumulative pore volume. The mercury-introducing pressure was 0.5 psi ($0.35 \times 10^{-3}$ kg/mm$^2$), and constants used to calculate the pore diameter from the pressure were a contact angle of 130° and a surface tension of 484 dyne/cm. The cumulative pore volume at a mercury pressure of 1800 psi (1.26 kg/mm$^2$ corresponding to a pore diameter of about 0.1 μm) was regarded as the total pore volume.

The total pore volume, and a median pore diameter at which the cumulative pore volume was 50% of the total pore volume were determined from the mercury porosimetry measurement results.

(b) Measurement of Coefficient of Thermal Expansion

A test piece having a cross section shape of 4.5 mm×4.5 mm and a length of 50 mm was cut out of the ceramic honeycomb structure with its longitudinal direction substantially in alignment with the flow path direction, and heated from room temperature to 800° C. at a temperature-elevating speed of 10° C./minute, to measure longitudinal length increase under a constant load of 20 g by ThermoPlus available from Rigaku Corp., which was a compression-load-type and differential-expansion-type thermomechanical analyzer (TMA), to determine an average coefficient of thermal expansion between 40° C. and 800° C.

(c) A-Axis Compression Fracture Strength

A test piece of 24.5 mm in diameter and 24.5 mm in length cut out of each ceramic honeycomb structure was measured with respect to A-axis compression fracture strength, according to M505-87, "Test Method of Monolithic Ceramic Carrier for Automobile Exhaust Gas Cleaning Catalyst" of the Society of Automotive Engineers of Japan.

TABLE 1

| No. | Silicon Carbide Particles Amount (% by mass) | $D50^{(1)}$ (μm) | Binder (Alumina Source Particles And Magnesia Source Particles) Alumina Source Particles$^{(2)}$ | $D50^{(1)}$ (μm) | Magnesia Source Particles$^{(3)}$ | $D50^{(1)}$ (μm) | Total Amount (% by mass) | $M2^{(4)}$ | Sintering Conditions Highest Temperature (° C.) | Time (hr) | Atmosphere |
|---|---|---|---|---|---|---|---|---|---|---|---|
| Example 1 | 90 | 40 | Alumina | 10 | Magnesium Hydroxide | 11 | 10 | 0.45 | 1300 | 4 | Air |
| Example 2 | 90 | 40 | Alumina | 10 | Magnesium Hydroxide | 11 | 10 | 0.40 | 1300 | 2 | Air |
| Example 3 | 90 | 40 | Alumina | 10 | Magnesium Hydroxide | 11 | 10 | 0.35 | 1300 | 2 | Air |
| Example 4 | 90 | 40 | Alumina | 10 | Magnesium Hydroxide | 11 | 10 | 0.50 | 1300 | 2 | Air |
| Example 5 | 90 | 40 | Alumina | 10 | Magnesium Hydroxide | 11 | 10 | 0.80 | 1300 | 2 | Air |
| Example 6 | 90 | 40 | Alumina | 10 | Magnesium Hydroxide | 11 | 10 | 0.30 | 1350 | 2 | Air |
| Example 7 | 90 | 40 | Alumina | 10 | Magnesium Hydroxide | 11 | 10 | 0.45 | 1350 | 2 | Air |
| Example 8 | 90 | 40 | Alumina | 10 | Magnesium Hydroxide | 11 | 10 | 0.50 | 1350 | 2 | Air |
| Example 9 | 90 | 40 | Alumina | 10 | Magnesium Hydroxide | 11 | 10 | 0.30 | 1400 | 2 | Air |
| Example 10 | 90 | 40 | Alumina | 10 | Magnesium Hydroxide | 11 | 10 | 0.40 | 1400 | 2 | Air |
| Com. Ex. 1 | 80 | 33 | Si | 4 | — | — | 20 | — | 1450 | 2 | Ar |
| Com. Ex. 2 | 90 | 40 | Alumina | 10 | Magnesium Hydroxide | 11 | 10 | 0.30 | 1250 | 2 | Air |
| Com. Ex. 3 | 90 | 40 | Alumina | 10 | Magnesium Hydroxide | 11 | 10 | 0.50 | 1250 | 2 | Air |

Note:
$^{(1)}$D50 means "median particle diameter."
$^{(2)}$A compound forming the alumina source particles.
$^{(3)}$A compound forming the magnesia source particles.
$^{(4)}$Molar ratio M2 [=(Al$_2$O$_3$)/(Al$_2$O$_3$ + MgO)].

TABLE 2

| No. | Crystal Phases in Binder Layers Cordierite (Molar Ratio M1)$^{(1)}$ | Spinel (Molar Ratio)$^{(2)}$ | Honeycomb Structure Porosity (%) | Median Pore Diameter (μm) | Evaluation Results CTE$^{(3)}$ (×10$^{-7}$/° C.) | A-Axis Strength (MPa) |
|---|---|---|---|---|---|---|
| Example 1 | 0.70 | 0.30 | 44.3 | 10.5 | 47.7 | 13.3 |
| Example 2 | 0.63 | 0.37 | 41.0 | 18.0 | 46.9 | 10.0 |
| Example 3 | 0.89 | 0.11 | 42.0 | 11.9 | 44.6 | 11.3 |
| Example 4 | 0.61 | 0.39 | 44.8 | 9.9 | 48.0 | 10.2 |
| Example 5 | 0.79 | 0.21 | 46.0 | 8.5 | 50.8 | 10.2 |
| Example 6 | 0.83 | 0.17 | 35.3 | 13.2 | 52.6 | 14.1 |
| Example 7 | 0.88 | 0.12 | 41.2 | 10.9 | 47.6 | 13.3 |
| Example 8 | 0.82 | 0.18 | 43.1 | 10.1 | 46.9 | 11.9 |
| Example 9 | 0.84 | 0.16 | 34.0 | 14.1 | 52.6 | 17.2 |
| Example 10 | 0.86 | 0.14 | 36.1 | 14.3 | 50.1 | 18.7 |
| Com. Ex. 1 | — | — | 49.0 | 9.0 | 46.1 | 8.7 |
| Com. Ex. 2 | 0.24 | 0.76 | 46.6 | 8.4 | 47.7 | 8.1 |
| Com. Ex. 3 | 0.30 | 0.70 | 46.2 | 8.3 | 49.4 | 7.3 |

Note:
$^{(1)}$Cordierite (molar ratio M1) = cordierite (mol)/[cordierite (mol) + spinel (mol)].
$^{(2)}$Spinel (molar ratio) = spinel (mol)/[cordierite (mol) + spinel (mol)].
$^{(3)}$CTE means "coefficient of thermal expansion."

It is clear from Tables 1 and 2 that the ceramic honeycomb filters of Examples 1-10 in the present invention, which had heat resistance equal to or higher than that of the ceramic honeycomb filters of Comparative Examples 1-3, were produced more inexpensively than in Comparative Examples 1-3, because they were able to be sintered at lower highest temperatures without needing a non-oxidizing atmosphere.

What is claimed is:

1. A silicon carbide ceramic honeycomb structure having large numbers of axially penetrating flow paths partitioned by porous silicon carbide cell walls, said cell walls comprising silicon carbide particles as aggregate and binder layers for binding said silicon carbide particles, and containing no metallic silicon, said binder layer consisting of a cordierite phase and a spinel phase, or consisting of a cordierite phase, a spinel phase, and at least one optional component selected from the group consisting of cristobalite, mullite and forsterite, the molar ratio M1 of said cordierite phase [=cordierite phase/(cordierite phase+spinel phase)] being 0.4-0.9, the porosity of said cell walls being 38-50%, and the median pore diameter of said cell walls being 5-20 μm.

2. A method for producing the silicon carbide ceramic honeycomb structure according to claim 1, comprising the steps of formulating, mixing and blending silicon carbide particles, a binder consisting of alumina source particles and magnesia source particles, and an organic binder to form a moldable material, extrusion-molding said moldable material to a honeycomb shape, drying the resultant green body, and sintering the green body in a temperature range of 1200-1350° C. in an air atmosphere, said organic binder being at least one selected from the group consisting of methylcellulose, ethylcellulose, ethyl methylcellulose, carboxymethyl cellulose, hydroxypropyl methylcellulose, hydroxyethyl cellulose, hydroxymethyl cellulose, and hydroxyethyl ethylcellulose, and said moldable material containing neither metallic silicon nor pore-forming material.

3. The method for producing a silicon carbide ceramic honeycomb structure according to claim 2, wherein said alumina source particles and said magnesia source particles are formulated at a molar ratio M2 [=($Al_2O_3$)/($Al_2O_3$+ MgO)] of 0.32-0.50.

4. The method for producing a silicon carbide ceramic honeycomb structure according to claim 2, wherein said alumina source particles and said magnesia source particles are 6-15% by mass in total, per 100% by mass of said silicon carbide particles.

5. The method for producing a silicon carbide ceramic honeycomb structure according to claim 2, wherein said alumina source particles are alumina or aluminum hydroxide particles, and said magnesia source particles are magnesium oxide or hydroxide particles, in said binder.

6. The method for producing a silicon carbide ceramic honeycomb structure according to claim 3, wherein said alumina source particles and said magnesia source particles are 6-15% by mass in total, per 100% by mass of said silicon carbide particles.

7. The method for producing a silicon carbide ceramic honeycomb structure according to claim 3, wherein said alumina source particles are alumina or aluminum hydroxide particles, and said magnesia source particles are magnesium oxide or hydroxide particles, in said binder.

8. The method for producing a silicon carbide ceramic honeycomb structure according to claim 4, wherein said alumina source particles are alumina or aluminum hydroxide particles, and said magnesia source particles are magnesium oxide or hydroxide particles, in said binder.

* * * * *